(12) United States Patent
Ohnishi et al.

(10) Patent No.: US 6,817,658 B2
(45) Date of Patent: Nov. 16, 2004

(54) VEHICLE SUNROOF SYSTEM

(75) Inventors: Masaharu Ohnishi, Wako (JP); Michio Tamura, Wako (JP); Tatsuya Ohara, Wako (JP); Hirofumi Yamane, Wako (JP); Tatsuaki Uehara, Tochigi (JP); Kouichi Hotta, Tochigi (JP)

(73) Assignees: Honda Giken Kogyo Kabushiki Kaisha (JP); Yachiyo Kogyo Kabushiki Kaisha (JP)

( * ) Notice: Subject to any disclaimer, the term of this patent is extended or adjusted under 35 U.S.C. 154(b) by 0 days.

(21) Appl. No.: 10/349,477

(22) Filed: Jan. 21, 2003

(65) Prior Publication Data

US 2003/0151275 A1 Aug. 14, 2003

(30) Foreign Application Priority Data

| Jan. 21, 2002 | (JP) | 2002-011384 |
| Jan. 21, 2002 | (JP) | 2002-011388 |
| Mar. 22, 2002 | (JP) | 2002-079907 |
| May 10, 2002 | (JP) | 2002-135230 |
| Jun. 5, 2002 | (JP) | 2002-164141 |

(51) Int. Cl.$^7$ .............................................. B60J 7/043
(52) U.S. Cl. .................. 296/213; 296/216.08; 296/217; 296/224
(58) Field of Search .............................. 296/213, 217, 296/221, 222, 216.08, 224

(56) References Cited

U.S. PATENT DOCUMENTS

| 4,502,726 A | * | 3/1985 | Adams | 296/221 |
| 4,630,860 A | * | 12/1986 | Fuerst et al. | 296/217 |
| 5,052,744 A | * | 10/1991 | Sugimoto | 296/213 |
| 6,164,718 A | * | 12/2000 | Stallfort | 296/222 |
| 6,390,545 B1 | * | 5/2002 | Makino et al. | 296/223 |
| 6,626,485 B2 | * | 9/2003 | Tamura et al. | 296/216.08 |

FOREIGN PATENT DOCUMENTS

| GB | 2031358 | * | 4/1980 | 296/217 |
| JP | 61085222 | | 4/1986 | B60J/7/05 |
| JP | 03-43024 | | 4/1991 | B60J/7/195 |
| JP | 07-40231 | | 7/1995 | B60J/7/195 |

* cited by examiner

Primary Examiner—Dennis H. Pedder
(74) Attorney, Agent, or Firm—Marger, Johnson & McCollom, P.C.

(57) ABSTRACT

In an automotive sunroof system which comprises a fixed roof panel defining a roof opening, an inner frame defining guide rails and drain grooves, a moveable panel guided along said guide rails via sliders and a slide and tilt mechanism for effecting a slide and tilt motion of the moveable pane, a terminal member is attached to each front corner of the inner frame to serve several purposes such as a closure member for the guide rail, a stopper for the forward travel of one of the sliders, a member for retaining the fore-and-aft movement of the moveable panel, and a support for a wind deflector device.

19 Claims, 14 Drawing Sheets

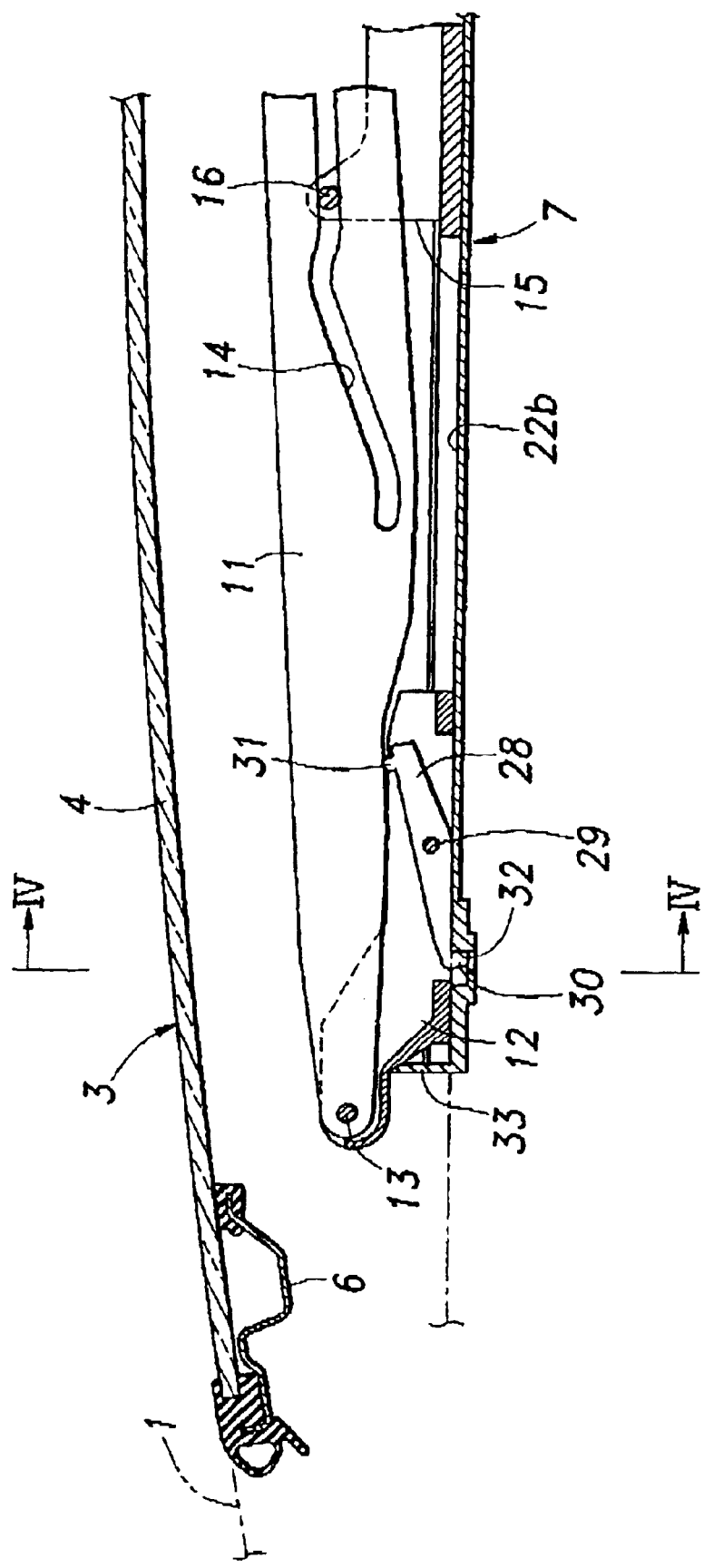

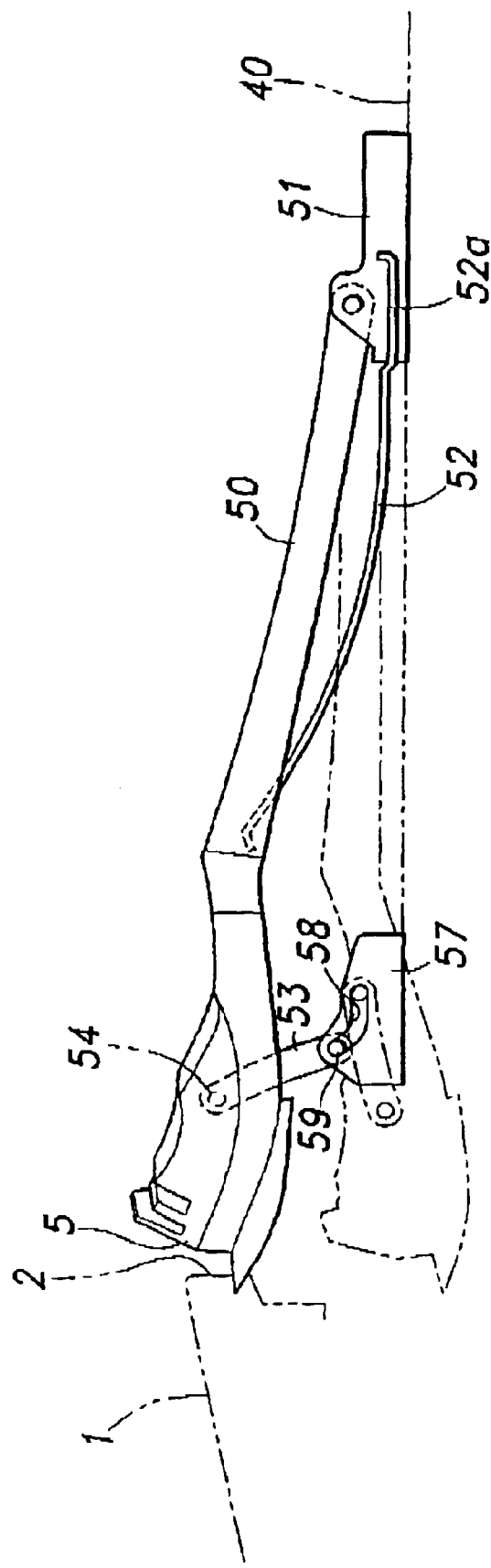

VEHICLE SUNROOF SYSTEM

TECHNICAL FIELD

The present invention relates to a vehicle sunroof system, and in particular to a vehicle sunroof system provided with an improved inner frame structure supporting the slide mechanism for a moveable sunroof panel.

BACKGROUND OF THE INVENTION

A vehicle sunroof system is typically provided with a moveable sunroof panel that can slide in a fore-and-aft direction to open and close a roof opening formed in a fixed roof panel of the vehicle. Typically, an inner frame including a pair of side frame members and a front frame member extending between the front ends of the side frame members is provided under the fixed roof panel as disclosed in Japanese Utility Model Laid Open Publication (Kokai) No. 7-40231. These frame members extend along the periphery of the roof opening, and are typically made of extruded aluminum alloy. The front frame member is provided with a front drain groove, and each side frame member is provided with a side drain groove and a guide rail for guiding the sliding movement if the moveable roof panel.

In such an arrangement, it is important to prevent moisture from entering not only the passenger compartment but also the guide rails and other parts of the mechanism for actuating the sunroof system. In particularly when the guide rail is formed as a part of an extruded side frame member, the front end of the guide rail remains exposed, and this could allow the intrusion of water into the guide rail.

Japanese Patent Publication (Kokoku) No. 5-23208 discloses an inner slide type sunroof system incorporated with a tilt mechanism. In the invention disclosed in the prior patent publication, a lock lever is pivotally supported by each front slider of the moveable panel, and an engagement projection provided at one end of this lock lever is adapted to engage an engagement hole formed in the corresponding side frame member to fixedly secure the moveable panel against the fore-and-aft movement except when the moveable panel is tilted down and slid rearward. In this lock lever arrangement. when the rear end of the moveable panel is lowered (tilted down), the other end of the lock lever is pushed down by the lower surface of the moveable panel and the engagement projection is lifted out of the engagement hole so that the moveable panel is thereby allowed to be slid rearward. Conversely, when the rear end of the moveable panel is raised to achieve the fully closed state of the moveable panel or further upwardly to achieve the tilted up state, the other end of the lock lever is disengaged from the lower surface of the moveable panel, and the engagement projection of the lock lever again fits into the engagement hole so that the moveable panel is firmly locked against any fore-and-aft movement.

However, when the side frame member is made of aluminum alloy which is relatively soft, the repeated engagement of the engagement projection with the engagement hole could cause excessive wear to the engagement projection, and this would lead to the generation of undesired rattling noises due to inadequate restraint of the moveable panel. It is conceivable to provide a separate member made of more wear resistant material for defining the engagement hole or to use a harder material for the side frame member, But, in either case, the manufacturing cost inevitably rises.

Tilting down of the moveable panel preceding the rearward sliding movement of the moveable panel is typically effected by engaging a lateral pin shaft provided in the rear slider in a cam slot formed in a side plate depending from the moveable panel and provided with a corresponding cam profile. However, a certain play is inevitable between the lateral pin shaft and cam slot, and this, combined with the plays in other parts of the related mechanism, could cause undesired rattling noises during the opening and closing operation of the sunroof system.

Typically, such a moveable panel is provided with front and rear sliders that are guided by the guide rails and is actuated by a push-pull cable attached to the rear sliders and driven by an electric motor. When closing the moveable panel, the push-pull cable is pushed until the moveable panel is fully closed. The fully closed position of the moveable panel is most often defined by a mechanical stop which limits the forward movement of the front sliders, and the push-pull cable tends to be abruptly compressed because of the inertia of the electric motor when the moveable panel comes to a stop. This abrupt compression of the push-pull cable could induce a buckling of the push-pull cable which would strike the cable against the sheath tube thereof or any other member adjacent to the push-pull cable, and thereby cause undesired noises.

Also, the mechanical stop that limits the forward movement of the front sliders must be capable of withstanding a substantial force, and the need for such a member not only increases the manufacturing cost but also requires an extra mounting space which is detrimental to the compact design of the sunroof system.

As the moveable panel tilts down and slides rearward, a guide pin provided in the side plate is guided downward and then rearward by a guide member defining a curved guide slot, and moves along an upper guide slot of the guide rail while the rear, slide is guided along a lower guide slot of the guide rail. Because the upper and lower guide slots are provided adjacent to each other, when the guide member is fitted into the guide rail, and the curved guide slot defined in the guide member is aligned with the upper guide slot, the guide member interferes with the lower guide slot. Therefore, the rearward movement of the front slider is limited by the guide member, and this limits the maximum stroke of the fore-and-aft movement of the moveable panel. This is not desirable because it is normally desired to maximize the opening area of the sunroof system, and the maximum stroke of the fore-and-aft movement of the moveable panel is therefore desired to be maximized.

A sunroof system is often provided with a wind deflector device that is deployed upward from the front edge of the roof opening to control the air flow into the passenger compartment and to prevent air flow noises. Typically, a deflector blade is supported by a pair of arms on either side and urged upward by a spring member so as to rise when the moveable panel is moved rearward and to be retracted as the moveable panel closes the roof opening. Japanese Utility Model Laid Open Publication (Kokai) No. 3-43024 discloses a support link mechanism for improving the support rigidity of such a wind deflector device. However, because the support link mechanism includes a support link member that extends obliquely from a front end of the moveable panel and the inner frame, the moisture On the moveable panel may drip along the support link particularly when closing the moveable panel, and may reach components of the sunroof system such as the guide rails. This is not desirable for the reliable operation of the sunroof system.

The base end of each deflector arm is pivotally supported by a side frame member. The side frame member is typically made of extruded aluminum while the deflector arm is made of stainless steel. Because the two parts made of different metals are in contact with each other, galvanic corrosion is induced. This could accelerate the corrosion of the side frame member and severely impair the durability of the sunroof system.

The side frame members of the inner frame are each provided with a drain groove and each terminal end of the drain groove is provided with a drain water outlet to expel water out of the vehicle. Typically, a hose is used for guiding water from the corresponding water drain outlet. Therefore, when a large amount of water is required to be released, such as when the vehicle accelerates or decelerates, the water flow fills the entire cross section of the internal passage of the drain water outlet member, and is prevented from flowing as smoothly as required because of the air trapped in the passage. In such a case, the water could overflow from the drain groove, and could even spill into the passenger compartment or into the guide rail. This could be avoided by increasing the size of the internal passage and the inner diameter of the hose, but this requires a larger space for accommodating such an increase in size, and increases the manufacturing cost.

BRIEF SUMMARY OF THE INVENTION

In view of such problems of the prior art, a primary object of the present invention is to provide an improved sunroof system having a favorable inner frame structure that is incorporated with guide rails and drain grooves.

A second object of the present invention is to provide an improved sunroof system which is free from rattling and other noises.

A third object of the present invention is to provide an improved sunroof system which is durable and economical.

A fourth object of the present invention is to provide an improved sunroof system which is suited for compact design.

A fifth object of the present invention is to provide an improved sunroof system which allows a relatively large stroke to the fore-and-aft movement of the moveable panel.

A sixth object of the present invention is to provide an improved sunroof system which can prevent moisture from dripping or otherwise entering the passenger compartment and the sunroof actuating mechanism.

A seventh object of the present invention is to provide an improved sunroof system which can allow moisture to be drained rapidly from the drip groove of the inner frame structure.

According to the present invention, such objects can be accomplished by providing a vehicle sunroof system, comprising a fixed roof panel defining a roof opening; an inner frame surrounding the opening under the fixed panel in a spaced relationship, the inner frame comprising a pair of side frame members and a front frame member extending between front ends of the side frame members; a pair of guide rails supported by the side frame members and extending in a fore-and-aft direction along either side of the roof opening, each of the guide rails being provided with a bottom wall and a pair of upright walls; a moveable panel slidably supported by the guide rails to selectively open and close the roof opening; and a terminal member attached to each front corner part of the inner frame; the terminal member comprising a vertical wall closing a corresponding end of a channel defined by the bottom wall and upright walls.

The front end of each guide rail is closed by the terminal member, and moisture or other foreign matter is prevented from getting into the guide rail. Preferably, each of the side frame members comprises a side drain groove extending along either side of the roof opening and the front frame member comprises a front drain groove communicating with front ends of the side drain grooves. Each of the upright walls may extend from a corresponding one of the side frame members while the bottom wall is defined by the side frame member.

According to a preferred embodiment of the present invention, the moveable panel is provided with a plurality of sliders that are guided by the guide rails, and at least one of the sliders pivotally supports a lock lever having an engagement projection at an end thereof, the terminal member being provided with an extension defining an engagement hole for receiving the engagement projection of the lock lever.

Thus, by selecting suitable material for the terminal member that serves the purpose of closing an end of the guide rail, the terminal member may also provide a highly wear resistant engagement hole for the lock lever, and this improves the durability of the sunroof system. The bottom wall of the guide rail may be provided with an opening aligning with the engagement hole so that the engagement hole may be provided in the center of the guide rail, and the moveable panel can be thereby even more firmly retained.

When the engagement hole is surrounded by a bead which fits into the opening in the bottom wall of the guide rail, the positioning of the terminal member with respect to the side frame member can be facilitated. If the opening in the bottom wall of the guide rail is provided with a rectangular or other non-circular shape, the terminal member is prevented from turning during the assembly process even when a threaded bolt is used for attaching the terminal member to the inner frame, and the assembly work is simplified.

Typically, the moveable panel is provided with a plurality of sliders that are guided by the guide rails. In such a case, the terminal member may additionally defining a stopper surface for defining a limit of a forward movement of one of the sliders, preferably via an elastic member, so that the number of component parts can be reduced, and the necessary mounting space may be reduced. As the terminal member can thus perform two or more functions by itself, a significant reduction in the manufacturing cost can be achieved.

An automotive sunroof system is often fitted with a wind deflector device comprising a deflector blade, and a pair of deflector arms supporting either end of the deflector blade at free ends thereof. In such a case, a base end of each of the deflector arms may be pivotally attached to a bottom surface of the side drain groove of the corresponding side frame member. Thus, the front drip groove and side drip grooves conveniently provide recesses for receiving the deflector blade and deflector arms in the retracted state of the deflector device so that the deflector device would not substantially increase the height of the overall sunroof system.

To avoid galvanic corrosion and improve the durability of the sunroof system, the base end of each of the deflector arms may be pivotally attached to the bottom surface of the side drain groove via an electrically insulating base member such as a plastic member. Also, for the same reason, a sheet spring for upwardly urging each deflector arm may be provided with a base end attached to the base member and a free end engaging the deflector arm.

To increase the support rigidity for the deflector blade, the deflector device may further comprise a support link member having a free end pivotally attached to the deflector blade and a base end engaged by a slot formed in a vertical portion extending from the terminal member to define a limit of an upward movement of the deflector blade. Thereby, the terminal member is enabled to perform yet another function. The support link member nay be provided with a rib for guiding moisture onto the front drain groove and thereby prevent intrusion of moisture into the passenger compartment or the guide rail structure.

To effect the tilt motion of the moveable panel, various mechanical components are interposed between the moveable panel and the inner frame. Therefore, plays between such mechanical components could cumulatively cause rattling or other noises. To avoid this problem, each of the rear sliders may be allowed to define the tilt down position of the moveable panel by engaging a part of the corresponding side plate via a resilient member. The resilient member produces a biasing force which tends to fill the plays that may exist between the mechanical components.

According to a preferred embodiment of the present invention, the upper guide slot and lower guide slot are provided with a lower wall and an upper wall, respectively, which are separated from each other. According to this arrangement, interference between the upper and lower guide slots is minimized, and this contributes to compact design of the sunroof system. This is particularly advantageous in the case of a tilt down mechanism in which as the moveable panel tilts down and slide rearward, a guide pin provided in the side plate is guided downward and then rearward by a guide member, and moves along an upper guide slot of the guide rail while the rear slide is guided along a lower guide slot of the guide rail. Because the guide member can be fitted into the upper guide slot without interfering with the lower guide slot, the rearward movement of the front slider is not obstructed by the guide member, and the stroke of the fore-and-aft movement of the moveable panel can be thereby maximized, According to a preferred embodiment of the present invention, the moveable panel is provided with a pair of side plates each carrying a front slider and a rear slider that are guided by the guide rail, and actuated by a push-pull cable connected to one of the rear sliders. In such a case, the guide rail may include a guide slot for receiving the push-pull cable while a front end of the guide slot for the push-pull cable being provided with a resilient stopper member for resiliently defining a limit of a forward travel of the push-pull cable before a forward movement of the moveable panel is mechanically limited by a part of the inner frame. By thus resiliently limiting the forward movement of the push-pull cable and avoiding an abrupt axial compression of the push-pull cable, the abrupt buckling of the cable can be avoided and hence the associated noises that would be otherwise caused by the buckling cable striking the adjacent wall can be avoided.

According to another aspect of the present invention, the sunroof system further comprises a drain outlet member attached to a rear end of each of the side drain grooves, the drain outlet member internally defining a drain outlet passage which communicates with the side drain groove and is divided by a partition wall into an upper air passage and a tower drain water passage. Because the passage in the drain outlet member would not be entirely filled by water as drain water is being expelled from the side drain groove of the side frame member out of the vehicle, and the air trapped in the drain outlet member is allowed to escape to the inlet end of the drain outlet member, the water can be all the more quickly expelled. According to a preferred embodiment, the drain outlet member comprises an inlet opening communicating with the side drain groove, a hose coupler and an internal passage communicating the hose coupler with the inlet opening, the internal passage being divided by the partition wall into the upper air passage and lower drain water passage. The drain outlet member can be made most conveniently by injection molding plastic material when the partition wall extends laterally across the internal passage of the drain outlet member.

BRIEF DESCRIPTION OF THE DRAWINGS

Now the present invention is described in the following with reference to the appended drawings, in which:

FIG. 3 is a somewhat enlarged longitudinal sectional view of the sunroof system when it is fully closed;

FIG. 13 is a fragmentary side view of the mechanism for raising the deflector blade;

DETAILED DESCRIPTION OF THE PREFERRED EMBODIMENTS

Figure 1:
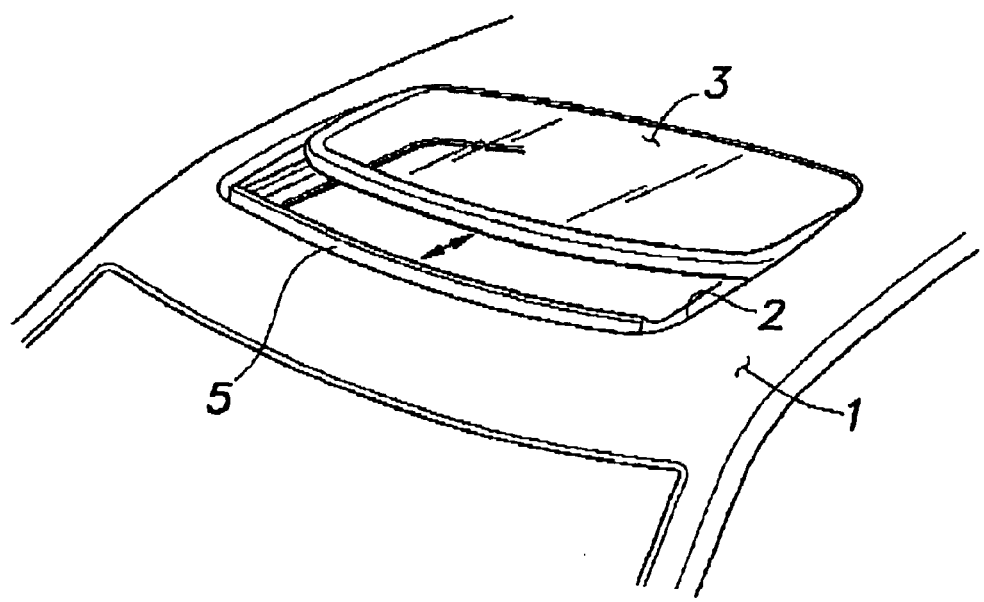
FIG. 1 is a fragmentary external perspective view of a vehicle sunroof system embodying the present invention.

FIG. 1 is a fragmentary perspective external view of a sunroof system embodying the present invention. A fixed roof panel 1 of a vehicle is formed with a substantially rectangular, somewhat laterally elongated opening 2 which is selectively closed by a moveable panel 3 conformal to the inner peripheral profile of the opening 2 and adapted to be slidable in the fore-and-aft direction as will be described hereinafter. A deflector blade 5 is provided along the front edge of the opening 2 for controlling the air flow that passes by the front edge of the opening 2 when the moveable panel 3 is opened. The deflector blade 5 consists of a plate member curved along the profile of the front edge of the opening 2, and is adapted to be raised and retracted with the opening and closing motion of the moveable panel 3, respectively, as will be described hereinafter.

Figure 4:
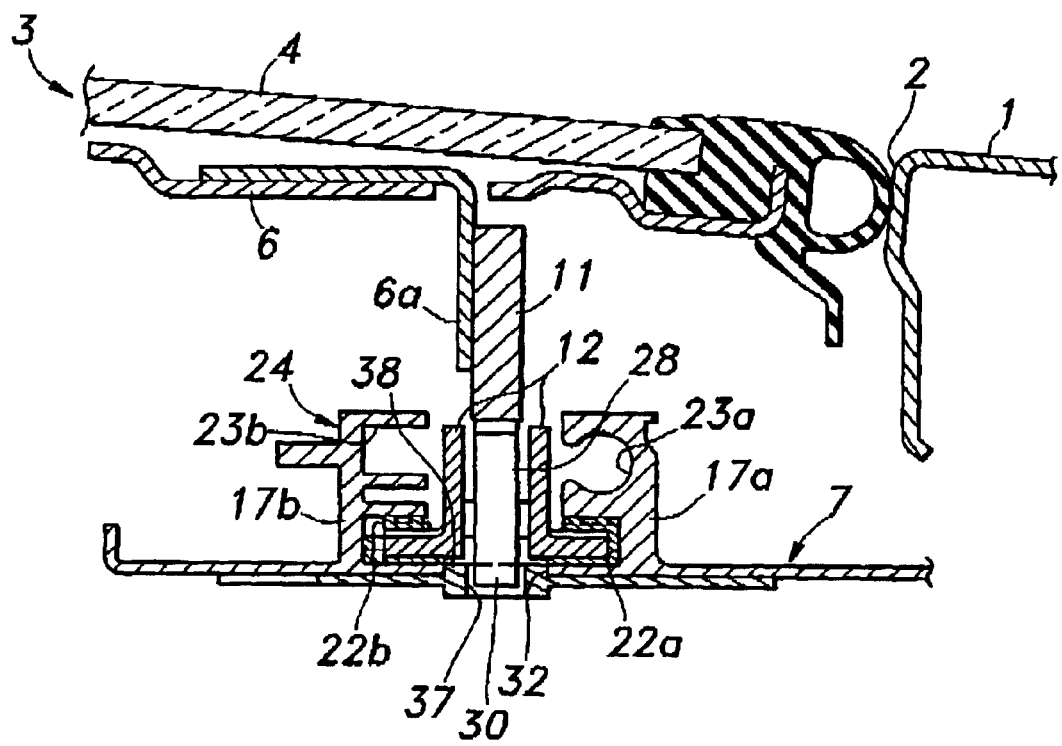
FIG. 4 is a sectional view taken along line IV—IV of FIG. 3.
Figure 2:
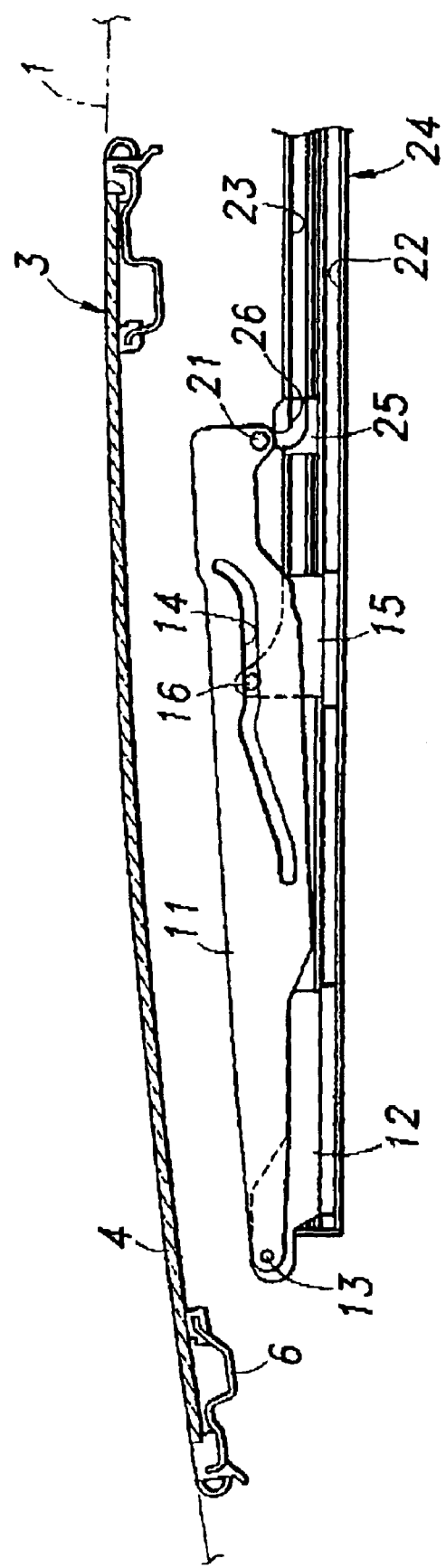
FIG. 2 is a longitudinal sectional view of the sunroof system when it is fully closed.

Referring to FIGS. 2 to 4, the moveable panel 3 comprises a glass panel 4, and a glass retainer 6 made of metallic material and attached to the outer periphery of the lower surface of the glass panel 4 by using a bonding agent. To each side of the lower surface of the glass retainer 6 is attached a side plate 11 via a stay member 6a. A front slider 12 is attached to the front end of each side plate 11 via a pin shaft 13. A rear slider 15 is provided with a laterally extending pin shaft 16 which fits into a cam slot 14 formed in an intermediate part of each side plate 11 so that the tilt motion and slide motion of the moveable panel 3 may be effected as will be described hereinafter. The front and rear sliders 12 and 15 are engaged by guide rails 24 formed as a part of side frame members 7 attached to an inner part of the fixed roof panel 1 so as to be slidable in the fore-and-aft direction.

Figure 9:
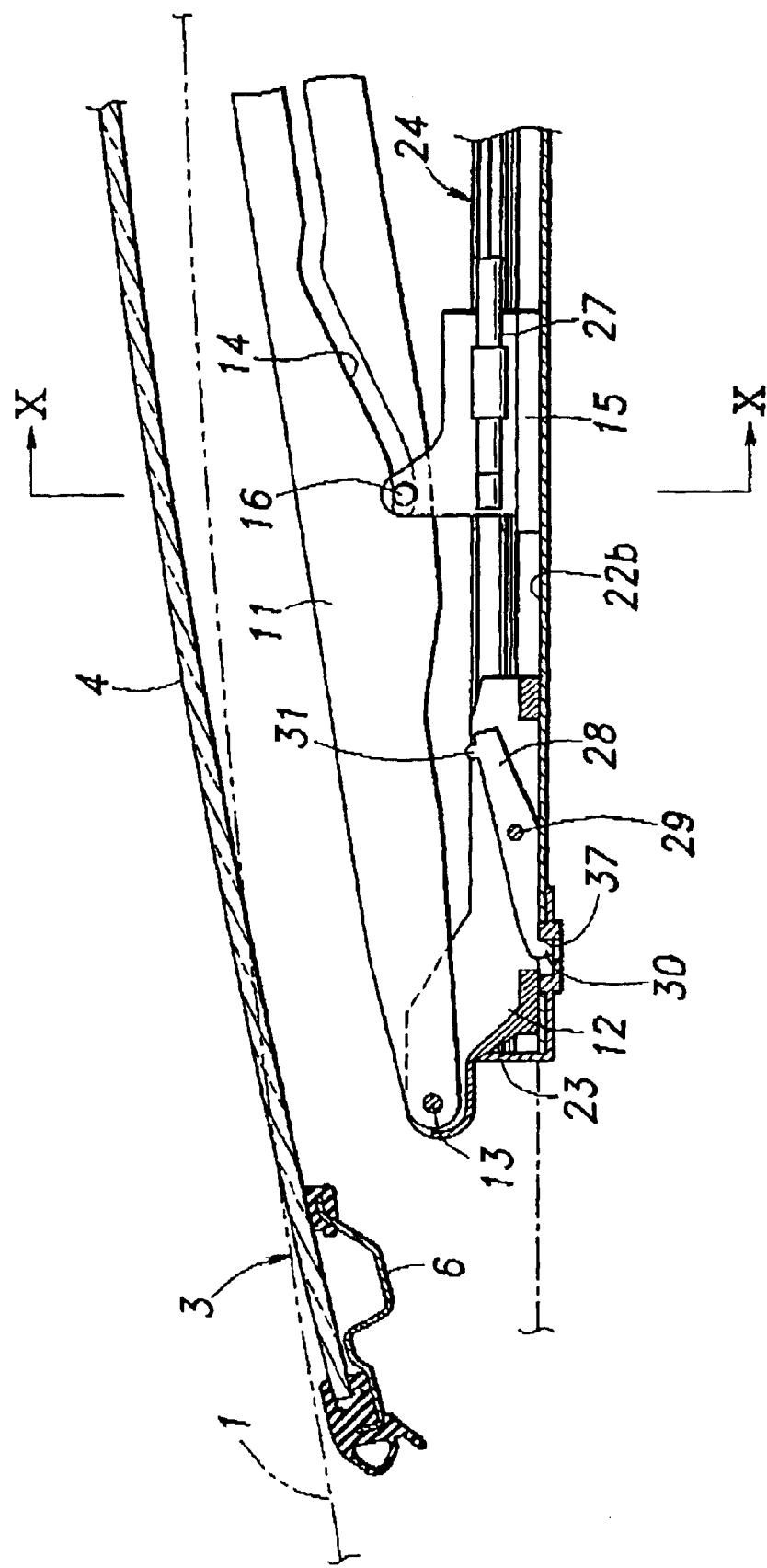
FIG. 9 is a view similar to FIG. 3 showing the sunroof system when the moveable panel is tilted up.

An end of a known push-pull cable 27 is connected to an outer lateral side of the rear slider 15 (See FIG. 9). By pushing and pulling this cable 27 with an electric motor, the rear slider 15 can be moved back and forth so that a desired tilt and slide motion of the moveable panel 3 may be effected.

Figure 5:
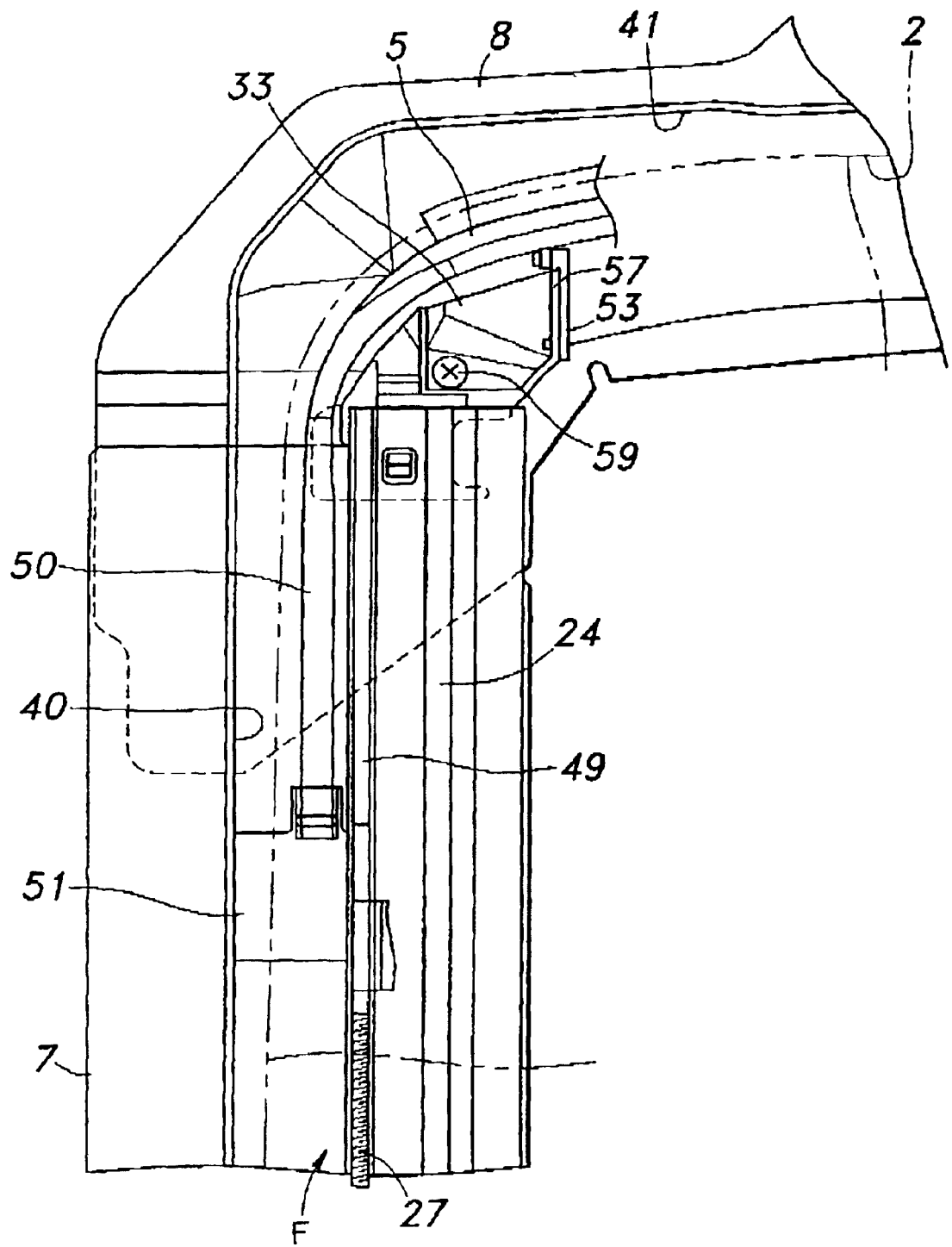
FIG. 5 is a fragmentary plan view showing the part at which the side frame member and front frame member are joined to each other.

Referring to FIG. 5, the inner frame F supporting the various components of the sunroof system comprises a pair of side frame members 7 extending along either side of the opening 2 and a front frame member 8 connecting the front ends of the side frame members 7. These frame members are made of extruded aluminum alloy in the illustrated embodiment. A front drain groove 41 is provided in the front frame member 8 and extends over an entire length thereof. A side drain groove 40 is provided in each side frame member 7 and extends over an entire length thereof. The front end of each side frame member 7 is connected to the corresponding side end of the front frame member 8.

Figure 6:
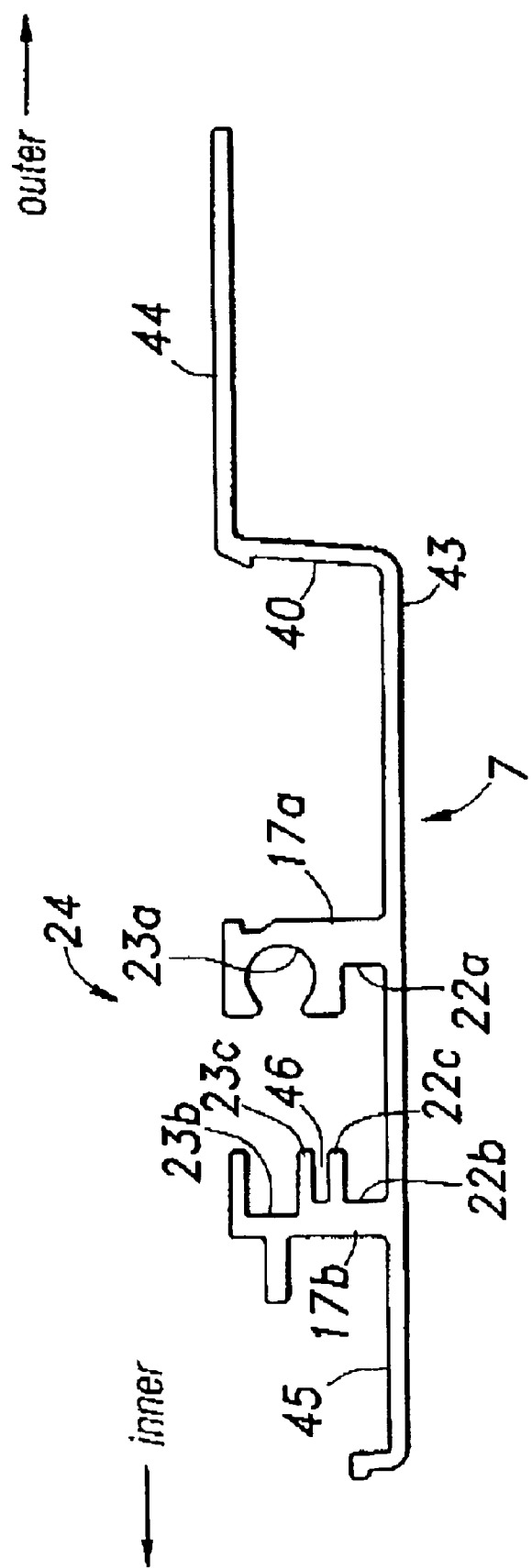
FIG. 6 is a cross sectional view of the side frame member.

Referring to FIG. 6, each side frame member 7 comprises substantially flat base portion 43 and is integrally formed with the guide rail 24. Each guide rail 24 comprises a pair of upright walls 17a and 17b integral with the base portion 43 and extending along the length of the side frame member 7. The outer side of the base portion 43 serves as a connecting part 44 for connecting the side frame member 7 to the roof inner panel, and the inner side of the base portion 43 serves as a sunshade retaining portion 45.

The guide rail 24 is provided with a pair of lower guide slots 22a and 22b laterally opposing each other and a pair of upper guide slots 23a and 23b also laterally opposing each. The front part of the lower guide slots 22a and 22b engage the front slider 12. The rear part of the lower guide slots 22a and 22b engage the rear slider 15 and the rear part of one of the upper guide slots 23b engages a laterally extending pin shaft 21 provided in a rear end of die side plate 11 when the moveable panel 3 is tilted down. The other upper guide slot 23a receives the push-pull cable 27 having one end attached to the rear slider 15.

Figure 7:
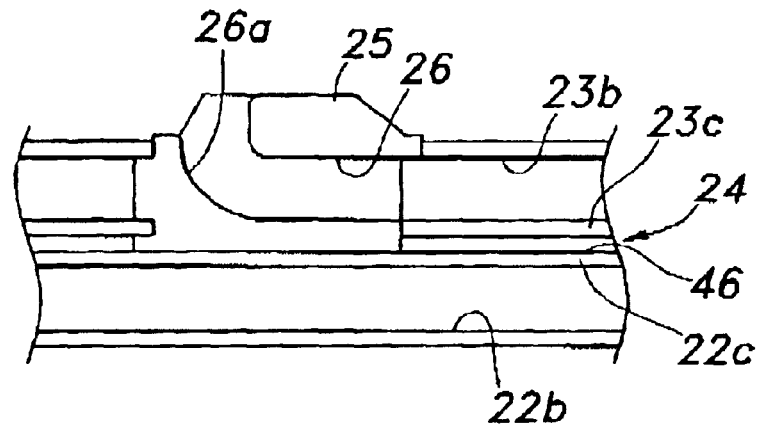
FIG. 7 is an enlarged fragmentary side view of the guide member.

As best illustrated in FIG. 7, a guide member 25 is provided in an appropriate part of the tipper guide slot 23b, and defines a curved guide slot 26 including a substantially vertical upper section and a curved section smoothly connecting the vertical upper section with the associated part of the corresponding upper guide slot 23b. The curved guide slot 26 is provided with a substantially same width as the upper guide slot 23b, and can smoothly guide the pin shaft 21 between the curved guide slot 26 and upper guide slot 23b. The guide member 25 is made of plastic material, and this to the elimination of noises as the pin shaft 21 moves between the curved guide slot 26 and the upper guide slot 23b. However, it may also be partly or entirely made of metallic material. In the former case, the outer periphery 26a of the curved guide slot 26 is defined by plastic material while the remaining part is made of metallic material.

As shown in FIGS. 6 and 7, a gap 46 is provided between the upper and lower (outer) guide slots 22b and 23b so that the lower wall 23c of the upper guide slot 23b and the upper wall 22c of the lower guide slot 22b are provided separately and spaced from each other. Therefore, even when a part of the lower wall 23c of the upper guide slot 23b is removed to install the guide member 25, the lower guide slot 22b would not be affected in any way. This allows the stroke of the movement of the front slider 12 to be increased or the stroke of the smooth movement of the moveable panel 3 to be increased. This is beneficial in increasing the area of the opening provided by the moveable panel 3.

Referring to FIG. 3, a lock lever 28 is connected to the front slider 12 to prevent the fore-and-aft movement of the moveable panel 3 at the front most position thereof when it is engaged. This lock lever 28 is pivotally supported by the front slider 12 via a laterally extending pin shaft 29 in an intermediate part thereof so as to be tiltable like a see-saw. The lock lever 28 is provided with an engagement projection 30 depending from a front end thereof, and a pusher projection 31 directed upward at a rear end thereof.

Figure 8:
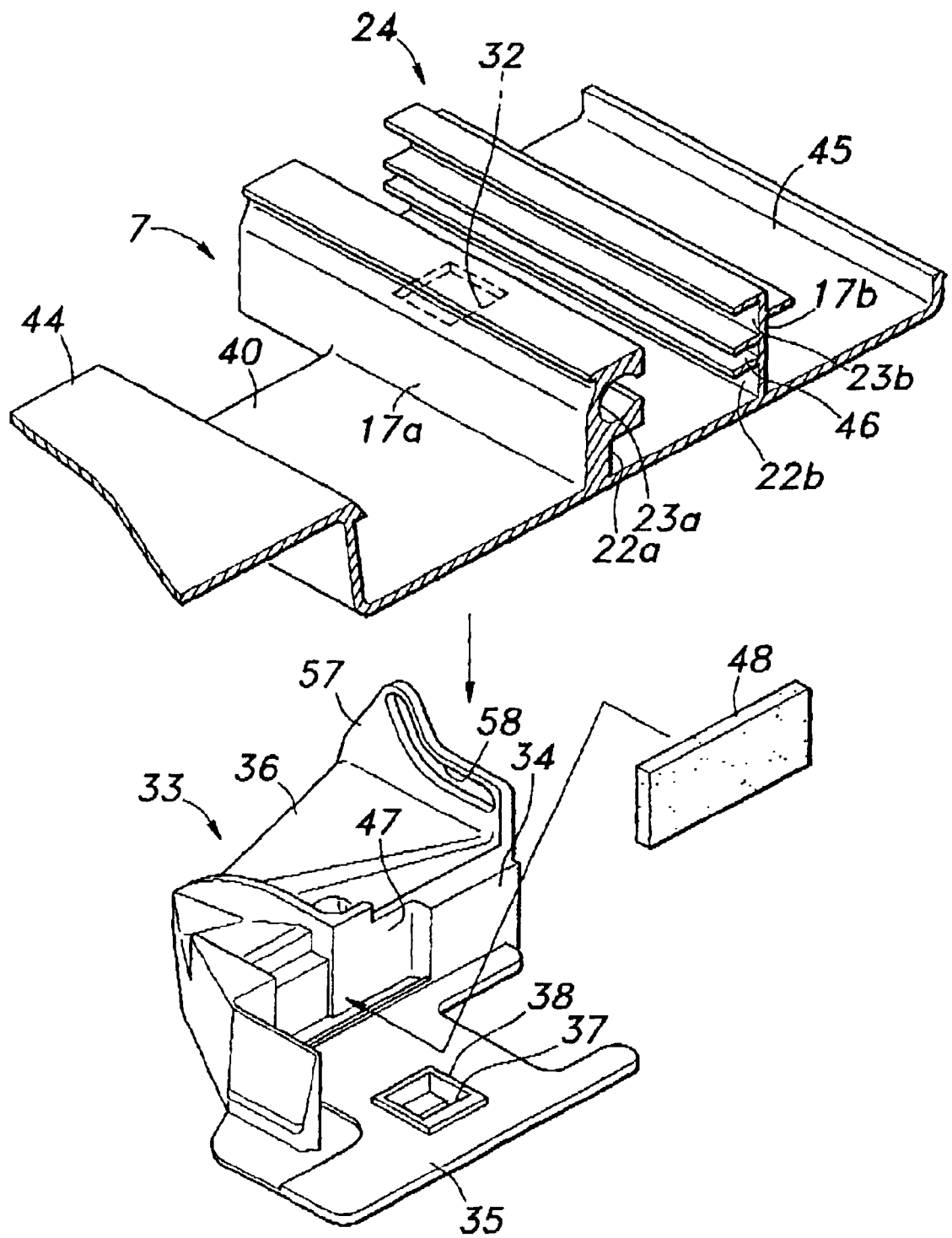
FIG. 8 is an exploded perspective view of the terminal member.

As best illustrated in FIG. 8, a terminal member 33 is mounted to a front part of each side frame member 7. The terminal member 33 may be made of such material as die-cast titanium or other light metal alloy which is both light and hard or injection molded plastic material which is both hard and wear-resistant, and includes a vertical wall 34 abutting the front end of the side frame member 7 (excluding the part corresponding to the side drain groove 40), a relatively thin horizontal extension or a horizontal portion 35 placed over the bottom surface of the front end of the base portion 43 of the side frame member 7, and a bracket portion 36 fixedly attached to the front frame member 8 with a threaded bolt 59. The horizontal portion 35 is provided with a rectangular engagement hole 37 surrounded by a bead 38 or a raised ridge, and the base portion 43 of the side frame member 7 or the part thereof located between the two vertical walls 17a and 17b of the guide rail 24 is provided with a rectangular opening 32 that receives the rectangular bead 38 surrounding the engagement hole 37. The rectangular bead 38 helps the positioning of the terminal member 33 relative to the side frame member 7, and facilitates the assembly work by preventing the rotation of the terminal member 33 relative to the side frame member 7 and hence relative to the front frame member 8 when fastening the threaded bolt for attaching the terminal member 33 to the front frame member 8. The opening 32 as well as the bead 38 may have a circular or any shape for engaging the engagement projection 30 of the lock lever 28, but is more preferably provided with a rectangular or other non-circular shape for the convenience of assembly work. The engagement hole 37 is adapted to receive the engagement projection 30 of the lock lever 28.

The vertical wall 34 is provided with a recess 47 for receiving a rectangular cushioning plate 48 made of elastomeric material. The cushioning plate 48 is attached to the bottom surface of the recess 47 with a bonding agent or the like. The cushioning plate 48 provides a stopper surface that limits the forward movement of the front slider 12 without producing any undesired noises.

Because the vertical wall 34 of the terminal member 33 closes the front end of the channel defined between the two upright walls 17a and 17b and sunshade retaining portion 45, and allows only the side drain groove 40 of the side frame member 7 to be exposed to or communicate with the front drain groove 41 of the front frame member 8, the rainwater in the side drain groove 40 can flow into the front drain groove 41 of the front frame member 8, and thence expelled out of the vehicle body via a drain outlet (not shown in the drawings) provided in each corner (or lateral end) of the front frame member 8 without spilling the rainwater into the guide rail or into the passenger compartment. Also, because the vertical wall 34 of the terminal member 33 closes the front end of the guide rail (including the upper and lower guide slots 22a, 22b, 23a and 23b) and the sunshade retaining portion 45, moisture is prevented from entering such parts.

The lock lever 28 is resiliently urged by a torsion coil spring (not shown in the drawing) wound around the pin shaft 29 in the direction to fit the engagement projection 30 into the engagement hole 37. Therefore, when the moveable panel 3 is fully closed, as shown in FIGS. 2 to 4, the engagement projection 30 is received in the engagement hole 37 so that the moveable panel 3 is locked against the fore-and-aft movement in its fully closed position and also in its tilted up position. Also, under this condition, the lower edge of each side plate 11 does not apply any force to the pusher projection 31 of the corresponding lock lever 28.

Figure 10:
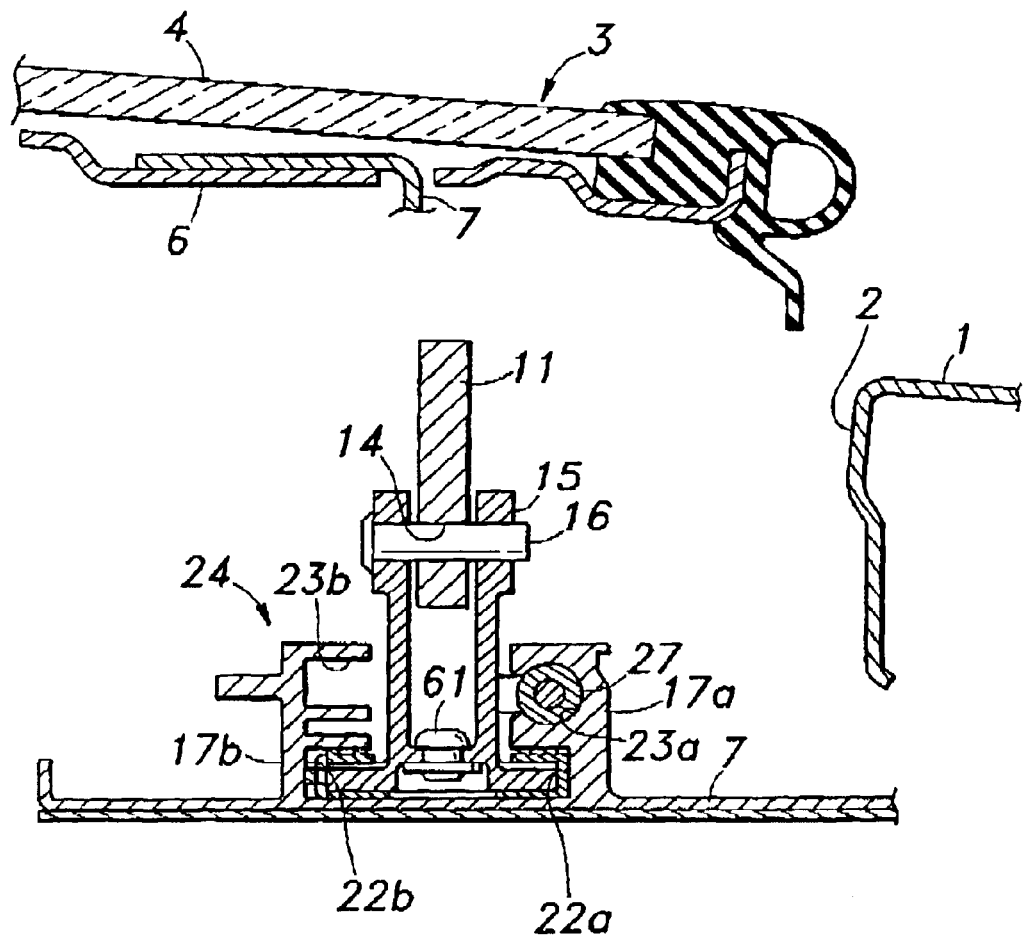
FIG. 10 is a sectional view taken along line X—X of FIG. 9.

Referring to FIGS. 9 and 10, when the moveable panel 3 is desired to be tilted up, the rear slider 15 is actuated in the forward direction by the push-pull cable 27 connected to the rear slider 15, and each side plate 11 is tilted around the pin shaft 13 with its rear end elevated owing to the interaction between the pin shaft 16 and cam slot 14 as illustrated in FIG. 9, This causes the lower edge of the side plate 11 to move away from the pusher projection 31 of the lock lever 28. Therefore, the lock lever 28 maintains its position with the engagement projection 30 kept received in the engagement hole 37, and the moveable panel 3 is allowed to be tilted with its rear end up white its fore-and-aft movement is prevented.

When the moveable panel 3 is desired to be tilted down, the rear slider 15 is pulled rearward, and the moveable panel 3 tilts down until the moveable panel 3 becomes flush with the fixed roof panel 1 owing to the interaction between the pin shaft 16 and cam slot 14.

As shown in FIG. 10, a cushioning member 61 is attached to a part of the rear slider 15 located directly under the pin shaft 16. This cushioning member 61 engages the lower surface of the side plate 11 when the moveable panel 3 has tilted down, and undergoes an elastic deformation. Therefore, the cushioning member 61 applies an upward biasing force to the side plate 11, causing the pin shaft 21 to be engaged by the upper edge of the upper guide slot 23b. Therefore, the play between the pin shaft 21 and the upper guide slot 23b can be removed, and rattling noises that could be caused by such a play can be avoided.

In such an actuating arrangement using a push-pull cable 27 described above, when the push-pull cable 27 has been fully pushed and the rear slider 15 has come to a stop with the moveable panel 3 fully tilted up, the electric motor tends to drive the cable excessively and cause a buckling or other deformation to the cable 27, and this could cause the cable to hit the wall of the cable guide slot 23a producing a certain noise. Such a noise tends to reduce the commercial acceptability of the sunroof system, and is therefore desired to be eliminated. To this end, in the illustrated embodiment, as shown in FIG. 5, a cushioning member 49 consisting of an elastomeric rod member is received in the cable guide 23a so as to define a stopper surface for the push-pull cable 27. In particular, before the rear slider 15 abuts a stopper surface that defines the mechanical limit of the forward movement of the rear slider 15, the front end of the push-pull cable 27 abuts the cushioning member 49. Thus, the front end of the push-pull cable 27 abuts the cushioning member 49 before the rear slider 15 comes to the stop so that any abrupt deformation of the push-pull cable 27 and, hence, any noises that could be caused by an abrupt deformation of the push-pull cable 27 can be avoided.

Figure 11:
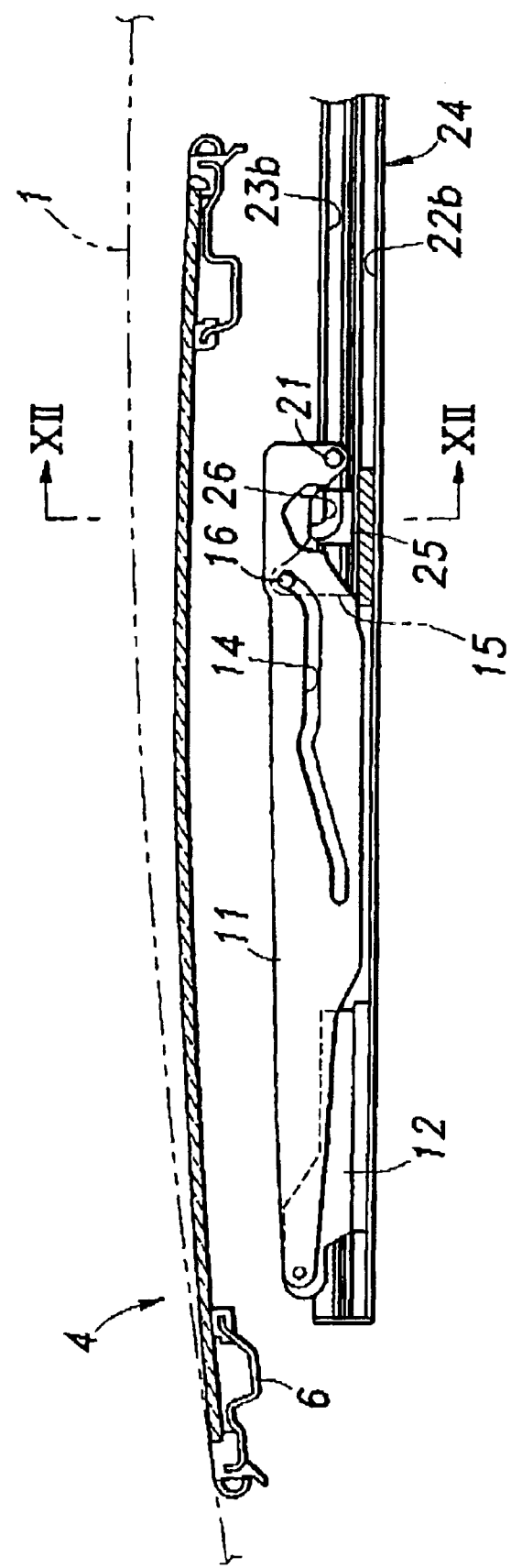
FIG. 11 is a view similar to FIG. 2 showing the sunroof system when the moveable panel is tilted down.
Figure 12:
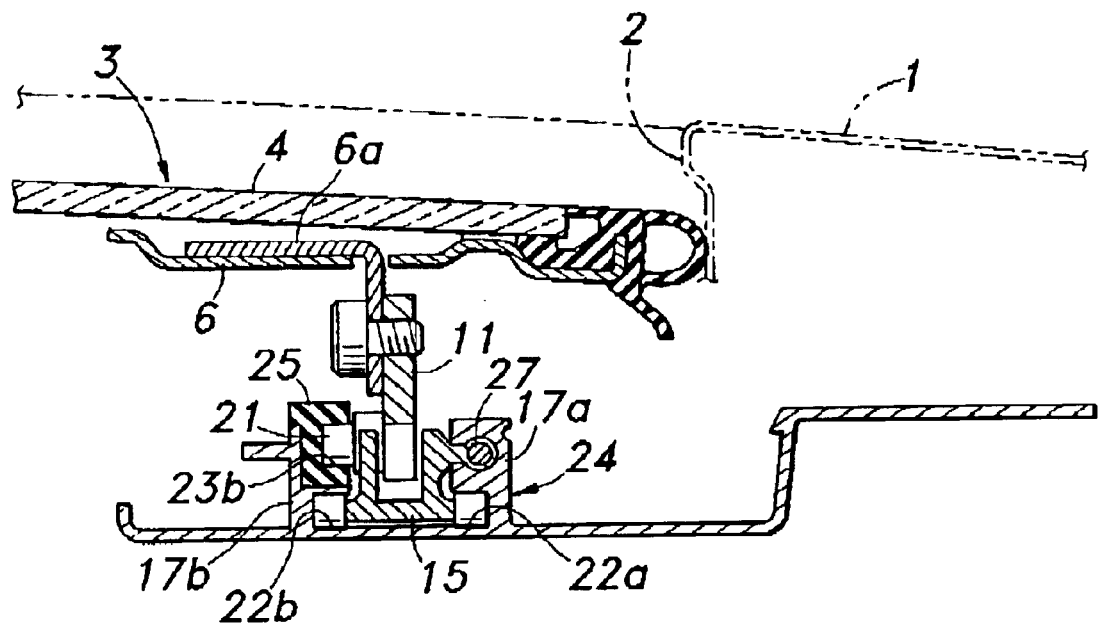
FIG. 12 is a sectional view taken along line XII—XII of FIG. 11.

Referring to FIGS. 11 and 12, when the moveable panel 3 is desired to be slid rearward and opened, the rear slider 15 is pulled further rearward, and by the pin shaft 21 being guided vertically downward along the vertical upper section of the curved guide slot 26 of the guide member 25, a slight tilt down of the rear part of the moveable panel 3 from a position flush with the fixed roof panel 1 around the pin shaft 13 is effected, This causes the lower edge of the side plate 11 to push down the pusher projection 31 and the engagement projection 30 to be disengaged from the engagement hole 37. Thus, the moveable panel 3 is allowed to be slid rearward and opened as desired with the engagement projection 30 disengaged from the engagement hole 37 and the pin shaft 21 guided along the curved guide slot 26 of the guide member 25 and then along the upper guide slot 23b of the guide rail 24. The moveable panel 3 in its open position is stowed in a space defined between the lower surface of the fixed roof panel 1 and an inner frame F supporting the guide rail 24. Under this condition, the movable panel 3 is kept from rattling or otherwise moving vertically with the side plate 11 pivotally attached to the front slider 12 which is in turn firmly guided by the lower guide slots 22a and 22b and the pin shaft 21 snugly received in the upper guide slot 23b.

Figure 14:
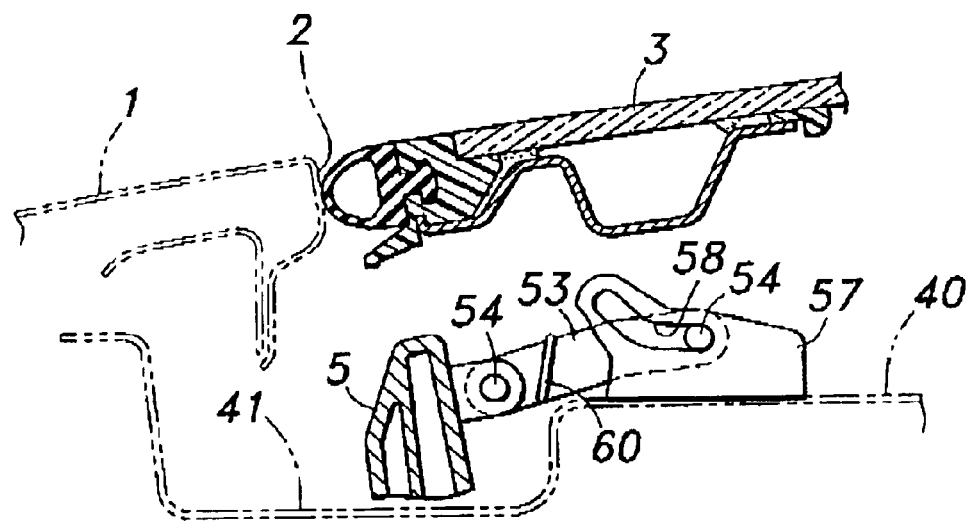
FIG. 14 is a fragmentary side view, partly in section, of the support link structure for the deflector blade.

Referring to FIGS. 13 and 14, a deflector arm 50 is pivotally attached to each side frame member 7 via a base member 51 which is fixedly attached to a bottom surface of the side drain groove 40. The two lateral ends of the deflector blade 5 are attached to the front ends of the deflector arms 50, respectively. The deflector blade 5 is received in the front drain groove 41 in its retracted state. Each deflector arm 50 is normally urged by a sheet spring 52 having a base end 52a fixedly attached to the base member 51 in the direction to raise the deflector blade 5. The base member 51 is made of plastic material.

In the illustrated embodiment, the side frame members 6 are made of aluminum alloy while the sheet springs 52 and deflector arms 50 are made of stainless steel. Therefore, if the part made of aluminum alloy and the parts made of stainless steel are directly connected each other, owing to the electricity produced by the contact between two different metals, galvanic corrosion could be induced, and this could damage the side frame members 6 in a relatively short period of time. Therefore, in the illustrated embodiment, the base member 51 is made of electrically insulating material such as plastic material, and the base end 52a of each sheet spring 52 and the base end of each deflector arm 50 are attached to the side frame member 7 via the base member 51. Therefore, galvanic corrosion is avoided, and the durability of the sunroof system can be improved.

Each lateral end of the deflector blade 5 is pivotally connected to the free end of a support link member 53 via a pin 54, and the base end of the support link member 53 is engaged by a slot 58 formed in a vertical portion 57 of the bracket portion 36 of the terminal member 33 fixedly attached to the front end of the corresponding side frame member 7. The slot 58 extends in the fore-and-aft direction, and is slightly slanted upward in a front part thereof. Thus, the base end of the support link member 53 attached to the deflector blade 5 at the free end thereof can freely move along the length of the slot 58 without being detached from the vertical portion 57 of the bracket portion 36 of the terminal member 33 so as to permit the vertical pivotal movement of the deflector blade 5 over a prescribed angular range. This arrangement contributes to the increase in the support rigidity for the deflector blade 5.

When the moveable panel 3 is closed, the deflector blade 5 is received in the front drain groove 41 with the deflector arms 50 pushed downward by the moveable panel 3 against the spring force of the sheet springs 52. When the moveable panel 3 is opened, the deflector arms 50 are allowed to pivot upward under the spring force of the sheet springs 52, and this causes the deflect blade 5 to be raised upward from the front edge of the opening 2. The limit of the upward movement of the deflect blade 5 is defined by the support link members 53 being engaged by the front end of the slot 58.

Each support link member 53 is slightly curved so as to face the convex side thereof upward, and a rib 60 or other ridge-shaped projection extends substantially vertically on an outer side thereof at a part slightly in front of the middle point of the support link member 53. The rib 60 preferably extends over the entire width of the support link member 53. The rib 60 prevents moisture that may deposit on the front part of the support link member 53 due to the water drip from the seal member of the moveable panel 3 or the like from reaching the guide rail 24 or the passenger compartment by guiding the moisture into the front drain groove 41. Therefore, the lower end of the rib 60 should be located above the front drain groove 41.

Figure 15:
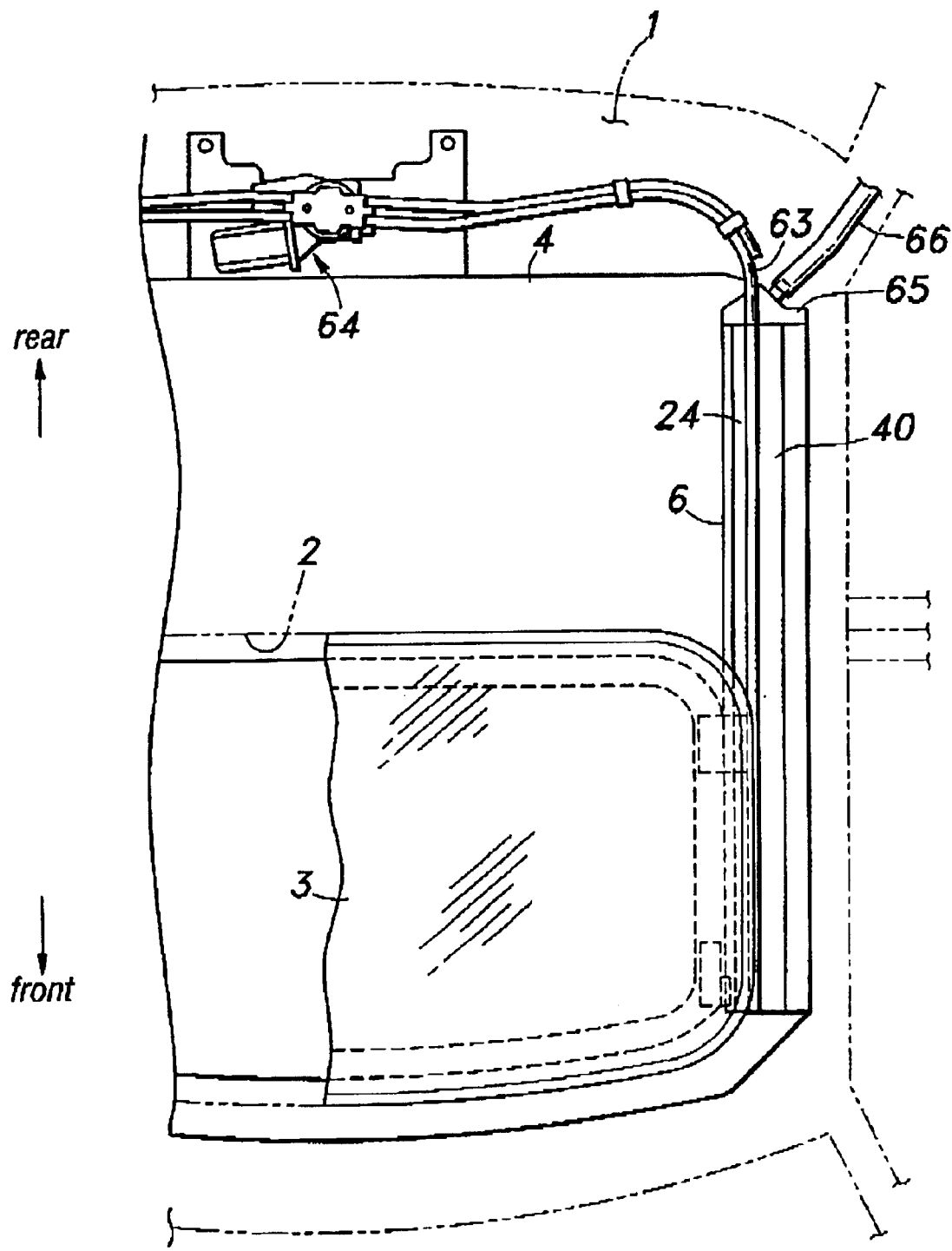
FIG. 15 is a fragmentary overall plan view of the sunroof system.
Figure 16:
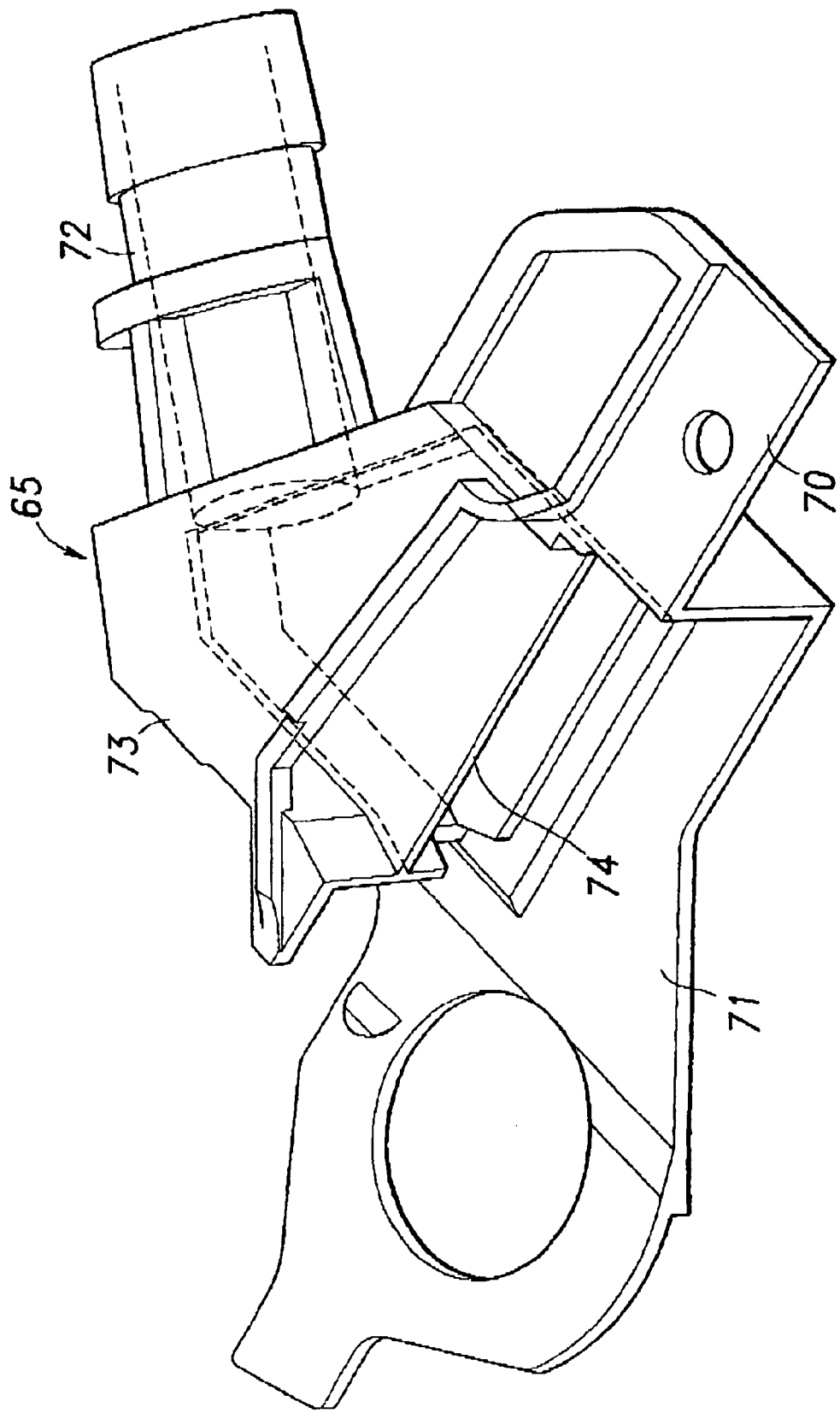
FIG. 16 is a perspective view of the drain outlet member.
Figure 17:
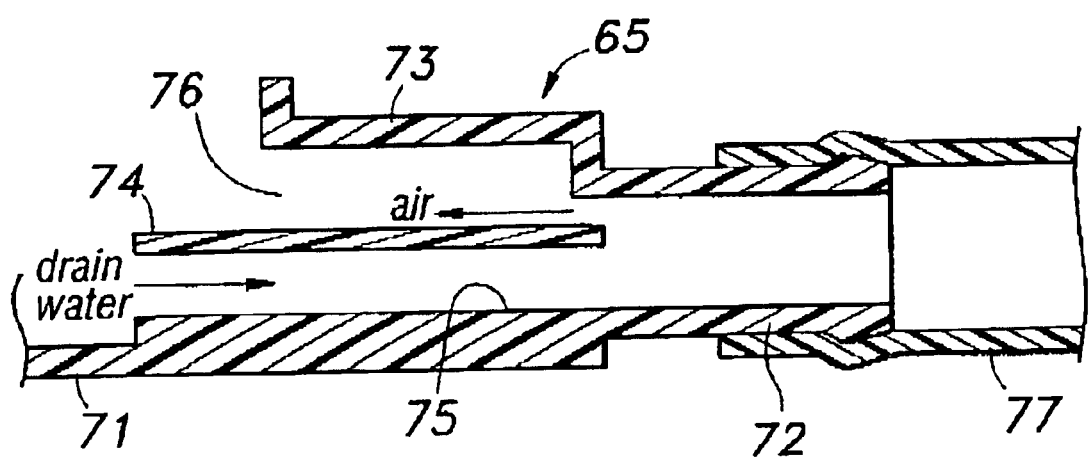
FIG. 17 is a longitudinal sectional view of the drain outlet member.

Referring to FIGS. 15 to 17, the rear end of each side frame member 7 is fitted with a drain outlet member 65 formed, for instance, by injection molding plastic material. The drain outlet member 65 comprises a mounting portion 70 for mounting the drain outlet member 65 to the rear end of the side frame member 7 by using a suitable fastener, a connecting portion 71 for connecting the drain outlet member 65 to the rear end of the side drain groove 40 of the side frame member 7 to receive moisture therefrom, a hose coupler 72 for connecting an end of a drain hose 77, and a passage portion 73 internally defining a passage having one end communicating with the drain groove 40 of the side frame member 7 and the other end communicating with the hose coupler 72. The interior of the passage portion 73 is divided by a partition wall 74 extending laterally across the width thereof.

Because the passage defined in the drain outlet member 73 is divided by the partition wall 74 into an upper passage 76 and a lower passage 75, as the water flows the lower passage 75 from the drain groove 40 to the hose coupler 72, the air in the hose coupler 72 and hose 77 connected thereto which is displaced by this water flow can flow the upper passage 76 in the opposite direction and be released to the atmosphere from the open upper part of the drain groove 40. Therefore, the entire cross section of the passage for the water to be drained would not be block by the water, and the water is allowed to be drained without any obstruction by the air trapped in the passage. Numerals 63 and 64 denote a metallic sheath for the push-pull cable 27 and the electric motor for actuating the push-pull cable 27, respectively.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle sunroof system comprising:
    a fixed roof panel defining a roof opening;
    an inner frame partly surrounding said opening under said fixed panel in a spaced relationship, said inner frame comprising a pair of side frame members and a front frame member extending between front ends of said side frame members;
    a pair of guide rails supported by said side frame members and extending in a fore-and-aft direction along either side of said roof opening, each of said guide rails being provided with a bottom wall and a pair of upright side walls;
    a moveable panel slidably supported by said guide rails to selectively open and close said roof opening; and
    a terminal member attached between the front end of each side frame member and a corresponding lateral end of said front frame member;
    wherein said moveable panel is provided with a plurality of sliders that are guided by said guide rails, and at least one of said sliders pivotally supports a lock lever having an engagement projection at an end thereof, said terminal member being provided with an extension defining an engagement hole for receiving said engagement projection of said lock lever.

2. A vehicle sunroof system according to claim 1, wherein each of said side frame members comprises a side drain groove extending along either side of said roof opening and said front frame member comprises a front drain groove communicating with front ends of said side drain grooves.

3. A vehicle sunroof system according to claim 2, wherein each of said guide rails comprises a pair of upright walls extending from a corresponding one of said side frame members and a bottom wall defined by said side frame member.

4. A vehicle sunroof system according to claim 1, wherein said bottom wall of said guide rail is provided with an opening aligning with said engagement hole.

5. A vehicle sunroof system according to claim 4, wherein said engagement hole is surrounded by a bead which fits into said opening in the bottom wall of said guide rail.

6. A vehicle sunroof system according to claim 5, wherein said opening in the bottom wall of said guide rail is provided with a non-circular shape.

7. A vehicle sunroof system according to claim 1, wherein said terminal member defines a stopper surface for defining a limit of a forward movement of one of said sliders.

8. A vehicle sunroof system according to claim 2, further comprising a deflector blade, and a pair of deflector arms supporting either end of said deflector blade at free ends thereof, a base end of each of said deflector arms being pivotally attached to a bottom surface of said side drain groove of the corresponding side frame member.

9. A vehicle sunroof system according to claim 8, wherein said base end of each of said deflector arms is pivotally attached to the bottom surface of said side drain groove via an electrically insulating base member.

10. A vehicle sunroof system according to claim 9, further comprising a sheet having a base end attached to said base member and a free end engaging said deflector arm.

11. A vehicle sunroof system according to claim 1, wherein the plurality of sliders provided to said moveable panel includes a pair of side plates each carrying a front slider and a rear slider that are guided by lower guide slots of said guide rail, said front sliders pivotally supporting a front part of said moveable panel, and said rear sliders being each provided with a pin shaft received by a cam slot provided in the corresponding side plate to effect a tilt down movement of said moveable panel before sliding said moveable panel rearward to open said roof opening;

said side plate being provided with a pin shaft guided by an upper guide slot of said guide rail to maintain a tilt down state of the said moveable panel as said moveable panel moves rearward to open said roof opening, each of said rear sliders defining said tilt down position of said moveable panel by engaging a part of the corresponding side plate via a resilient member.

12. A vehicle sunroof system comprising:

a fixed roof panel defining a roof opening;

an inner frame partly surrounding said opening under said fixed panel in a spaced relationship, said inner frame comprising a pair of side frame members and a front frame member extending between front ends of said side frame members;

a pair of guide rails supported by said side frame members and extending in a fore-and-aft direction along either side of said roof opening, each of said guide rails being provided with a bottom wall and a pair of upright side walls;

a moveable panel slidably supported by said guide rails to selectively open and close said roof opening;

a terminal member attached between the front end of each side frame member and a corresponding lateral end of said front frame member; and a support link member having a free end pivotally attached to said deflector blade and a base end engaged by a slot formed in a vertical portion extending from said terminal member to define a limit of an upward movement of said deflector blade.

13. A vehicle sunroof system according to claim 12, wherein said support link member is provided with a rib for guiding moisture onto said front drain groove.

14. A vehicle sunroof system according to claim 11, wherein said upper guide slot and lower guide slot are provided with a lower wall and an upper wall, respectively, which are separated from each other.

15. A vehicle sunroof system according to claim 1, wherein the plurality of sliders includes a front slider and a rear slider, and a forward travel of said front slider is defined by a part of said terminal member.

16. A vehicle sunroof system according to claim 15, wherein said terminal member part comprises a resilient member.

17. A vehicle sunroof system comprising:

a fixed roof panel defining a roof opening;

an inner frame partly surrounding said opening under said fixed panel in a spaced relationship, said inner frame comprising a pair of side frame members and a front frame member extending between front ends of said side frame members;

a pair of guide rails supported by said side frame members and extending in a fore-and-aft direction along either side of said roof opening, each of said guide rails being provided with a bottom wall and a pair of upright side walls, each of said side frame members comprising a side drain groove extending along either side of said roof opening and said front frame member comprising a front drain groove communicating with front ends of said side drain grooves;

a moveable panel slidably supported by said guide rails to selectively open and close said roof opening; and a drain outlet member attached to a rear end of each of said side drain grooves, said drain outlet member internally defining a drain outlet passage which communicates with said side drain groove and is divided by a partition wall into an upper air passage and a lower drain water passage.

18. A vehicle sunroof system according to claim 17, wherein said drain outlet member comprises an inlet opening communicating with said side drain groove, a hose coupler and an internal passage communicating said hose coupler with said inlet opening, said internal passage being divided by said partition wall into said upper air passage and lower drain water passage.

19. A vehicle sunroof system according to claim 18, wherein said partition wall extends laterally across said internal passage of said drain outlet member.

\* \* \* \* \*

UNITED STATES PATENT AND TRADEMARK OFFICE
CERTIFICATE OF CORRECTION

PATENT NO.     : 6,817,658 B2
DATED          : November 16, 2004
INVENTOR(S)    : Ohnishi et al.

It is certified that error appears in the above-identified patent and that said Letters Patent is hereby corrected as shown below:

Column 1,
Line 24, replace "movement if the" with -- movement of the --.
Line 63, replace "frame member, But," with -- frame member. But, --.

Column 2,
Line 34, replace "while the rear, slide" with -- while the rear slide --
Line 61, replace "the moisture On the" with -- the moisture on the --.

Column 3,
Lines 52 and 53, replace "comprising a fixed roof" with -- comprising: a fixed roof --.

Column 4,
Line 39, replace "additionally defining a" with -- additionally define a --.

Column 5,
Line 37, replace "thereby maximized," with -- thereby maximized. --.
Line 61, replace "tower drain water" with -- lower drain water --.

Column 7,
Line 54, replace "end of die side" with -- end of the side --.

Column 8,
Line 1, replace "this to the elimination" with -- this contributes to the elimination --.

Column 9,
Line 39, replace "end up white its" with -- end up while its --.

Column 10,
Line 19, replace "13 is effected, This" with -- 13 is effected. This --.

UNITED STATES PATENT AND TRADEMARK OFFICE
CERTIFICATE OF CORRECTION

PATENT NO.   : 6,817,658 B2
DATED        : November 16, 2004
INVENTOR(S)  : Ohnishi et al.

It is certified that error appears in the above-identified patent and that said Letters Patent is hereby corrected as shown below:

Column 12,
Line 63, replace "comprising a sheet having" with -- comprising a sheet spring having --.

Signed and Sealed this

Twenty-first Day of February, 2006

JON W. DUDAS
*Director of the United States Patent and Trademark Office*